United States Patent [19]

Tregay

[11] Patent Number: 4,998,022
[45] Date of Patent: Mar. 5, 1991

[54] OPTICAL LIQUID LEVEL SENSOR USING A POLYTETRAFLUOROETHYLENE PERFLUOROALKOXY MATERIAL

[75] Inventor: George W. Tregay, Amherst, N.Y.

[73] Assignee: Conax Buffalo Corporation, Buffalo, N.Y.

[21] Appl. No.: 455,447

[22] PCT Filed: Mar. 22, 1988

[86] PCT No.: PCT/US88/00907
§ 371 Date: Nov. 15, 1989
§ 102(e) Date: Nov. 15, 1989

[87] PCT Pub. No.: WO89/03978
PCT Pub. Date: May 5, 1989

[51] Int. Cl.$^5$ ............................................. G01N 15/06
[52] U.S. Cl. ................................. 250/577; 250/903; 73/293; 356/136
[58] Field of Search .................... 250/227.31, 574, 577, 250/903; 340/618, 619; 73/293; 356/133, 136

[56] References Cited

U.S. PATENT DOCUMENTS

| | | | |
|---|---|---|---|
| 4,320,291 | 3/1982 | Uramoto | 250/227 |
| 4,322,713 | 3/1982 | Duck et al. | 73/293 |
| 4,354,180 | 10/1982 | Harding | 250/577 |
| 4,427,293 | 1/1984 | Harmer | 356/133 |
| 4,440,022 | 3/1984 | Masom | 73/293 |
| 4,676,638 | 6/1987 | Yasuda | 356/136 |
| 4,783,599 | 11/1988 | Borden | 250/574 |
| 4,859,864 | 8/1989 | Smith | 250/577 |
| 4,881,487 | 11/1989 | Moore | 250/577 |
| 4,882,499 | 11/1989 | Luukkala et al. | 250/577 |

FOREIGN PATENT DOCUMENTS

| | | | |
|---|---|---|---|
| 2363787 | 5/1978 | France | 73/293 |
| 1518492 | 7/1978 | United Kingdom | 340/619 |
| 2121175A | 12/1983 | United Kingdom | |

Primary Examiner—David C. Nelms
Assistant Examiner—Stephone B. Allen
Attorney, Agent, or Firm—Sommer, Oliverio & Sommer

[57] ABSTRACT

An optical liquid level sensor has an optically-transmissive body (28) provided with a frusto-conical tip end portion (32). When the tip end portion is exposed to air, the angle of incidence ($\theta_i$) of light at each of three points of reflection (b,c,d) is less than the critical angle ($\theta_c$) such that substantially all light transmitted through the body will be reflected internally. However, when the tip end portion is exposed to a liquid, light is refracted, and the intensity of the reflected light is reduced. The intensity of the reflected light is used to indicate whether the sensor is above or below the surface of the liquid.

15 Claims, 2 Drawing Sheets

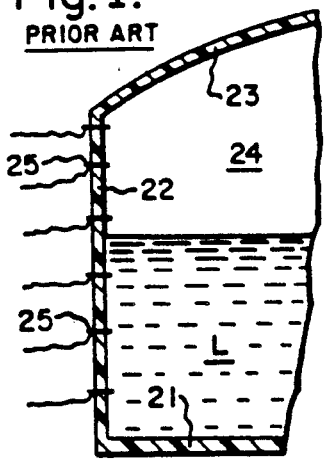
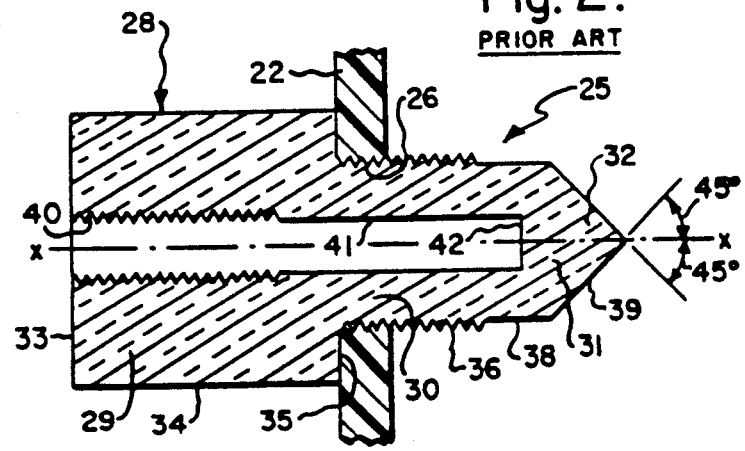
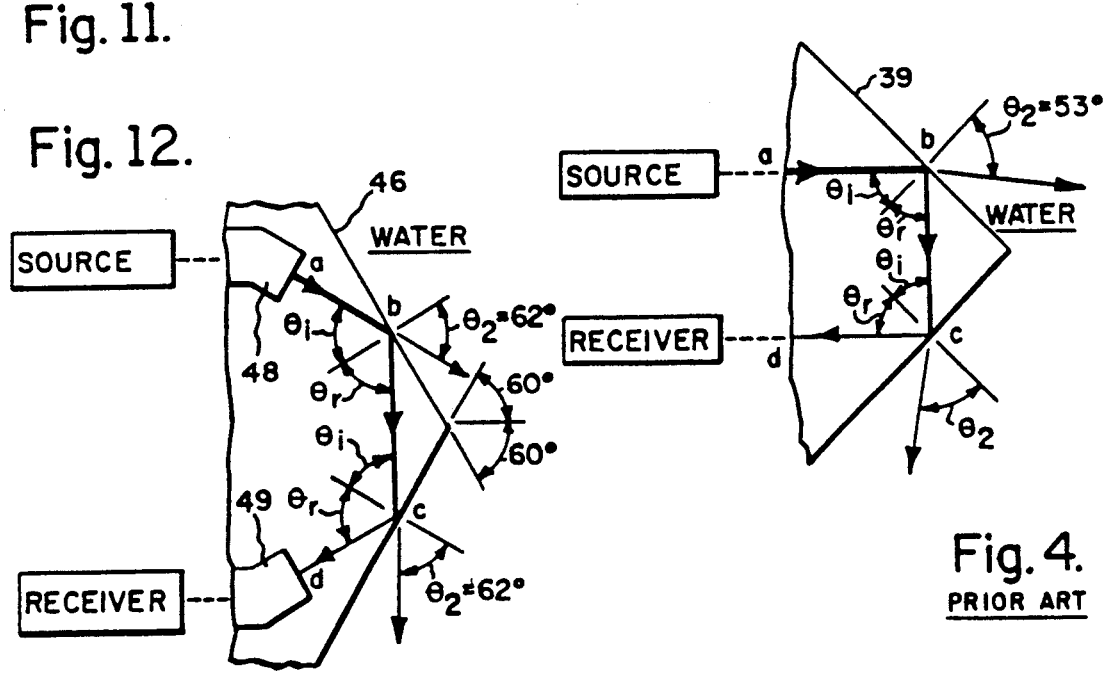

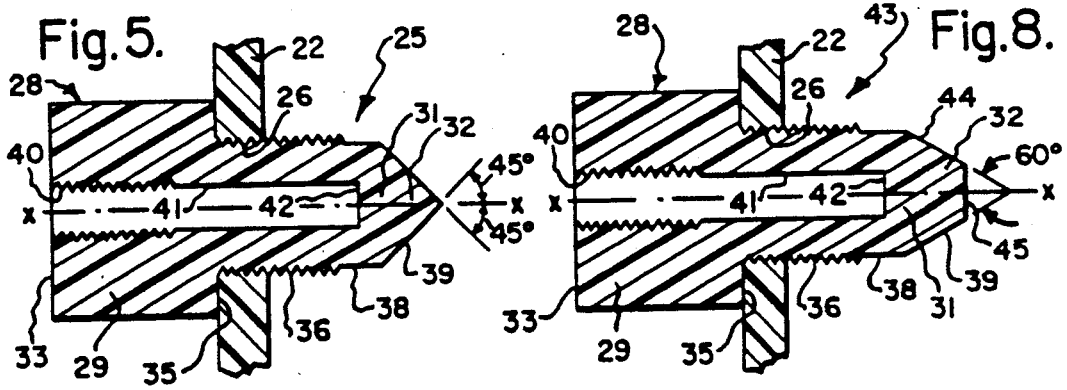
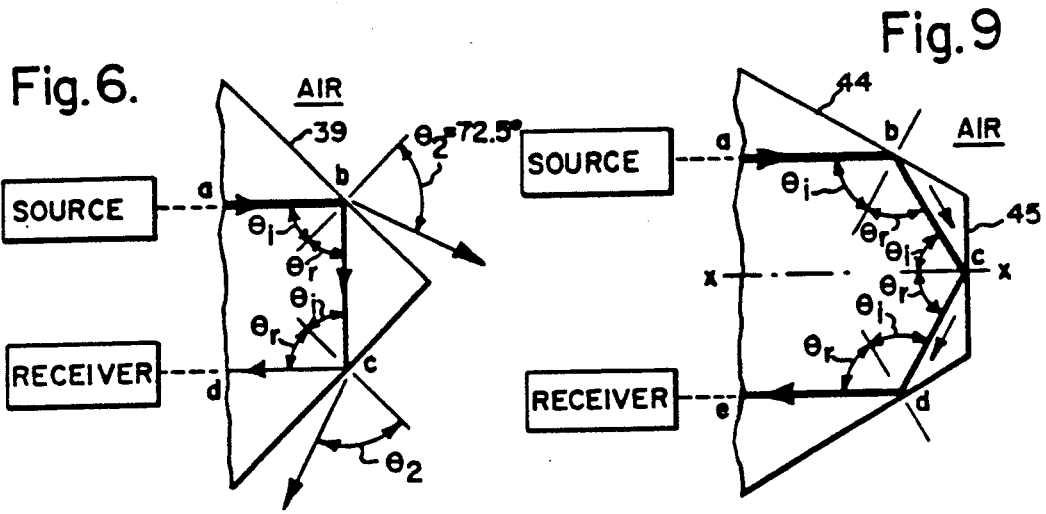
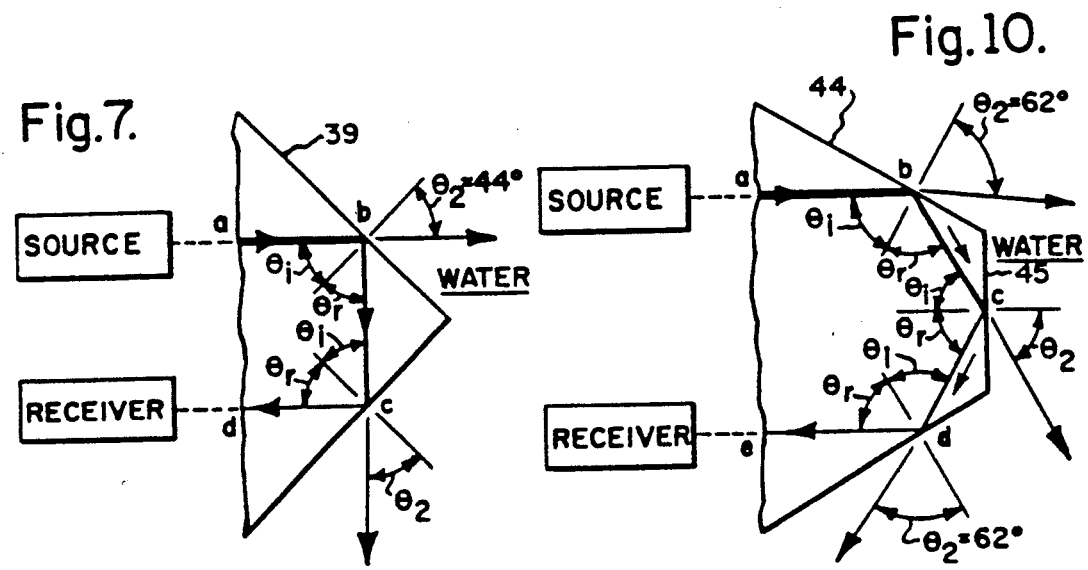

OPTICAL LIQUID LEVEL SENSOR USING A POLYTETRAFLUOROETHYLENE PERFLUOROALKOXY MATERIAL

TECHNICAL FIELD

This invention relates generally to the field of optical liquid level sensors, and, more particularly, to an improved liquid level sensor which is particularly adapted for use with corrosive liquids that would otherwise chemically attack a conventional optical sensor.

BACKGROUND ART

It is frequently necessary to measure or monitor the level of liquid in a tank or container. This has commonly been done by means of a float-type device.

However, it is also known to measure the liquid level by means of a plurality of optical sensors, which are positioned on the tank wall at various vertically-spaced elevations. Basically, a transparent body is provided with a conical or prismatic tip end portion. Light is propagated within the body toward the tip end portion, and is reflected by two surfaces at the tip end portion back toward a receiver. The body is typically glass and has a refractive index of about 1.50. If the tip end portion is exposed to air above the surface of the liquid, the "critical angle", at which all light is reflected within the body, may be calculated from the equation:

$$\sin \theta_c = n_2/n_1 \quad (1)$$

where $\theta_c$ is the "critical angle", $n_2$ is the index of refraction of the fluid (i.e., air) to which the tip is exposed, and $n_1$ is the index of refraction of the material (i.e., glass) of the tip end portion. Thus, for air, $n_2 = 1.00$; and for glass, $n_1 = 1.50$. Hence, this equation may readily be solved, and the "critical angle" for a glass body with respect to air is about 42°. On the other hand, if the tip end portion is submerged in a liquid, such as water (i.e., $n = 1.33$), then the "critical angle" with respect to water is about 62.5°.

If the prismatic surfaces are ground such that the angles of incidence are equal to or greater than the "critical angle", then all of the light propagated along the sensor body will be reflected internally of the body, and no portion of such incident light will be refracted into the surrounding fluid. This is known as the phenomenon of "total internal reflection". On the other hand, if the angle of incidence is less than the "critical angle", then only a portion of the light will be reflected, with the balance being refracted into the fluid surrounding the tip end portion.

Upon information and belief, such prior art devices have been commonly formed such that the angle of incidence ($\theta_i$) is about 45°. Hence, incident light strikes a first surface, is reflected to a second surface, and is thereafter reflected back through the body in a direction substantially parallel to the incident light beam. At the same time, such angle (i.e., 45°) is greater than the "critical angle" for air/glass (i.e., $\theta_c = 42°$), such that "total internal reflection" occurs when the tip end portion is exposed to air. However, if the tip end portion is submerged in water, the angle of incidence is less than the "critical angle" for water/glass (i.e., $\theta_c = 62.5°$). Hence, an incident light beam will be twice refracted into the liquid. The first refraction would occur at the first surface, and the second at the second surface.

This principle (i.e., that "total internal reflection" occurs if the tip end portion is exposed to air, but that light is refracted if the tip end portion is submerged in liquid) has been used to measure the level of liquid in a tank. See, e.g., Rakucewicz, "Fiber-Optic Methods of Level Sensing", Sensors (Dec. 1986) [at p. 5 et seq.]. As indicated above, a plurality of such sensors are typically mounted on the tank wall at various vertically-spaced locations. Those sensors which are arranged above the liquid level will reflect light at a greater intensity than those which are submerged in the liquid. Thus, depending on the intensity of the internally-reflected light, one can infer whether such sensor is above or below the liquid surface.

However, in some instances, the serviced fluid may chemically attack the material of which the sensor body is made. For example, one common optical material, glass, is chemically attacked by hydroflouric acid (HF). Another common material, sapphire, is chemically attacked by sulfuric acid ($H_2SO_4$). Thus, these conventional materials are unsuited for use in such a hostile environment.

Such corrosive fluids (e.g., hydroflouric acid, sulfuric acid, and the like) are commonly contained within tanks made of a polytetrafluoroethylene perfluoroalkoxy material, commonly known as "Teflon ® PFA", manufactured by E. I. du Pont de Nemours & Co. (Inc.), Wilmington, Del. 19898. This material is relatively insensitive to chemical attack by many corrosive liquids. Because of this, upon information and belief, others have proposed to make a sensor body from such Teflon ® PFA material. Indeed, it has been specifically proposed to formulate a sensor body of such material, but having the conventional 45° prismatic tip end portion. This solution, while perhaps adequately addressing the problem of chemical attack, is believed to be inoperable with respect to certain serviced fluids. The reason for this is that such Teflon ® PFA material has an index of refraction of approximately 1.35. Hence, the "critical angle" with respect to air would be about 48°, whereas the "critical angle" with respect to, say, water (i.e., $n = 1.33$ would be about 80°). In other words, if one were to make an optical sensor of such Teflon ® PFA material, having an angle of incidence of 45° on each inclined tip end surface, the angle of incidence would always be less than the "critical angle" with respect to air (i.e., $\theta_i = 45° < \theta_c = 48°$), and with respect to water (i.e., $\theta_i = 45° < \theta_c = 80°$), and light would always be refracted into the surrounding fluid regardless of whether the tip end portion was exposed to air or water. Hence, such a device would not employ the principle of "total internal reflection" to selectively provide a reflected signal of one intensity when the tip end portion is surrounded by air, but a reflected signal of lesser intensity, due to refraction, when the tip end portion is surrounded by liquid. Moreover, whereas typical optically-transmissive materials, such as glass, sapphire, and the like are relatively transparent, Teflon ® PFA materials is milky or cloudy in color. Thus, some light passing through such material will be diffused, thereby further diminishing the intensity of the internally-reflected beam.

Thus, upon information and belief, the problem of providing an acceptable optical liquid level detector, particularly for use with corrosive liquids which might chemically attack the sensor body, has persisted.

DISCLOSURE OF THE INVENTION

The present invention broadly provides an improved optical sensor having a light-transmissive body terminating in a tip end portion, the tip end portion being adapted to be exposed to first and second fluids of different refractive indices, a light source for supplying a beam of light through the body to the tip end portion, and a light receiver for measuring the intensity of light reflected back from the tip end portion through the body.

In one aspect, the improvement comprises: the tip portion having (i.e., in longitudinal cross-section) first, second and third surfaces, the first surface being arranged to receive incident light from the source and to reflect light to the second surface, the second surface being arranged to light received from the first surface to the third surface, the third surface being arranged to reflect light received from the second surface back toward the light receiver. Each of these surfaces is inclined such that the angle of incidence is equal to or greater than the "critical angle" when the tip end portion is exposed to the first fluid so that substantially all of the light in the beam will be reflected internally of the body. However, at least one, and preferably all, of the surfaces are inclined such that the angle of incidence is less than the "critical angle" when the tip end portion is exposed to the second fluid so that a major portion of the incident light will be refracted into the second fluid, with only a minor portion being reflected back to the light receiver. Hence, the intensity of the internally-reflected light will be less when the tip end portion is exposed to the second fluid, than when the tip end portion is exposed to the first fluid. The first fluid may, for example, be air or some other gas, and the second fluid may be a suitable liquid. The body may be formed of Teflon ® PFA or some similar material, and the tip end portion may be frusto-conical, a truncated-prism, or have some other shape or configuration.

In another aspect, the improvement comprises: a conical tip end portion, a first light guide provided within the body for directing a beam of light from a suitable light source to a first cross-sectional surface, and a second light guide provided within the body for transmitting the light reflected from the first surface to a second cross-sectional surface back to the receiver. The first and second light guides are arranged that when the tip end portion is exposed to the first fluid, the angle of incidence of light falling on each of the first and second surfaces will be equal to or greater than the "critical angle" with respect to the first fluid, but when the tip end portion is exposed to the second fluid, the angle of incidence of light falling on at least one, and preferably both, of the first and second surfaces will be less than the "critical angle" with respect to the second fluid, whereby the intensity of light reflected back to the receiver will be less when the tip end portion is exposed to the second fluid than when the tip end portion is exposed to the first fluid.

In still another aspect, the improvement comprises: a light-transmissive body being formed of a material having a refractive index of about 1.35, and/or having an angle of incidence of more than 45°. The tip end portion has a plurality of surfaces, in cross-section, so configured, dimensioned and arranged that incident light from the source will be reflected back toward the receiver. The angle of incidence of each surface is equal to or greater than the "critical angle" with respect to the first fluid, but less than the "critical angle" with respect to the second fluid. Hence, substantially all of the light from the source will be reflected internally of the body when the tip end portion is exposed to the first fluid, but only a small fractional portion of the light from the source will be reflected back when the tip end portion is exposed to the second fluid.

Accordingly, the general object of the invention is to provide an improved optical liquid level sensor.

Another object is to provide an improved optical liquid level detector which is particularly adapted for use with corrosive liquids.

These and other objects and advantages will become apparent from the foregoing and ongoing written specification, the drawings, and the appended claims.

BRIEF DESCRIPTION OF THE DRAWINGS

FIG. 1 is a schematic fragmentary vertical sectional view of a tank containing a liquid, this view showing a plurality of vertically-spaced optical sensors as penetrating the side wall to measure the level of liquid within the tank.

FIG. 2 is an enlarged fragmentary longitudinal vertical sectional view of one of the sensor bodies shown in FIG. 1.

FIG. 3 is a further enlarged schematic view of the tip end portion of the sensor shown in FIG. 2, and illustrating the light path when the tip end portion is exposed to air.

FIG. 4 is a schematic view similar to FIG. 3, but showing that some of the light is refracted when the tip end portion is surrounded by liquid.

FIG. 5 is a fragmentary longitudinal vertical sectional view of a proposed sensor body formed of Teflon ® PFA, but being otherwise physically dimensioned and configured as the proposed sensor body shown in FIG. 2.

FIG. 6 is an enlarged schematic view of the tip end portion of the sensor body shown in FIG. 5, and showing that light will be refracted when the tip end portion is surrounded by air.

FIG. 7 is a schematic view of the sensor body shown in FIG. 6, and showing that light will be refracted when the tip end portion is surrounded by water.

FIG. 8 is a fragmentary longitudinal sectional view of a first form of the improved sensor body, this embodiment having a frusto-conical tip end portion.

FIG. 9 is an enlarged schematic view of the improved tip end portion shown in FIG. 8, and showing the path of light reflection when the improved tip end portion is exposed to air.

FIG. 10 is a schematic view similar to FIG. 9, but showing that light will be refracted when the tip end portion is submerged in the liquid.

FIG. 11 is a schematic view of a modified form of the improvement in which an outgoing light guide is arranged to direct light from the source against one cross-sectional surface of a conical tip end portion, and a receiver light guide is arranged to receive light reflected from a second cross-sectional surface, this view showing the path of reflected light when the tip end portion is surrounded by air.

FIG. 12 is a schematic view of the structure shown in FIG. 11, but illustrating that some light is refracted when the tip end portion is surrounded by liquid.

MODE(S) OF CARRYING OUT THE INVENTION

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.) simply referred to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, this invention provides an improved optical detector or sensor which is believed to be particularly useful in measuring the level of various corrosive liquids, such as hydroflouric acid (HF), sulfuric acid ($H_2SO_4$), nitric acid ($HNO_3$), phosphoric acid ($H_3PO_4$), acetic acid ($CH_3COOH$), various solvents, and the like. However, it should be clearly understood that the improved sensor is not limited to use with these named compounds, but is generally useful with other types of fluids as well. As used herein, the term "fluid" is intended to mean either a liquid or a gas. While the presently-preferred embodiments will now be described with reference to detecting the level of water in a tank or container, merely for purposes of illustration, the invention does contemplate that the invention might possibly be used to sense the interface between other gases and/or liquids, or between two discrete liquids (e.g., oil and water), so long as the tip end portion surfaces are within acceptable tolerances and the light receiver is sufficiently sensitive to determine the changes in the intensity of the reflected light.

Optical liquid level detectors are known. For example, FIG. 1 schematically depicts a tank 20 having a bottom 21, side wall 22 and cover 23, and as containing a quantity of liquid L, such as water. The ullage or head space 24 above the surface of the liquid is filled with gas, such as air, which is assumed to be substantially at room temperature and atmospheric pressure. A plurality of vertically-spaced optical liquid level detectors, severally indicated at 25, sealingly penetrate horizontal openings provided through the side wall so as to have their rightward tip end portions physically arranged within the tank. The particular means for sealing the joint between each detector and the associated side wall opening is deemed to be collateral to an understanding of the present improvement. Hence, such details have been omitted in the interest of clarity. Suffice it to say that such joint is suitably sealed, such as by means of one or more O-Rings (not shown) or the like. In any event, those detectors which are submerged in the liquid will return an internally-reflected optical signal of relatively-low intensity, while those which are positioned above the surface of the liquid will return a signal of greater intensity. From these, it can be inferred that the surface of the liquid surface is somewhere between adjacent detectors providing the optical signals of different intensity. Obviously, if the vertical spacing between adjacent sensors is large, the indicated position of the liquid surface will be measured coarsely, whereas, if the detectors are spaced more closely together, the indicated measurement will be more accurate. The vertical spacing between the various sensors is largely dictated by the degree of accuracy needed.

Prior Art Level Detector (FIGS. 2-4)

A prior art liquid level detector 25, such as shown and described in Rakucewicz, "Fiber-Optic Methods of Level Sensing", Sensors (Dec. 1986) [at p. 5 et seq.], is shown in FIG. 2 as being mounted on a portion of tank side wall 22. This side wall is schematically shown as being provided with a tapped horizontal through-hole 26, to accommodate passage of a penetrant portion of the sensor body.

This particular sensor is indicated as having, in pertinent part, an elongated specially-configured body 28 generated about horizontal axis x—x, and as having an outer portion 29 arranged to the left of tank wall 22, as having an intermediate portion 30 penetrating opening 26, and as having an inner portion 31 physically arranged within the tank and terminating in a tip end portion 32. The sensor body has an annular vertical left end face 33, and has an outer surface which sequentially includes (from left-to-right in FIG. 2): a polygonal surface 34 extending rightwardly from the left end face, a rightwardly-facing annular vertical surface 35 abutting the leftwardly-facing marginal portion of the side wall outer surface about opening 26, an externally-threaded portion 36 matingly engaging the threads of hole 26, an outwardly-facing horizontal cylindrical surface 38, and an outwardly- and rightwardly-facing conical surface 39 converging to form the tip end portion. The angle of convergence of conical surface 39 is 90°. Hence, each surface (in cross-section) is inclined with respect to axis x—x at an angle of 45°, as indicated. A blind hole extends axially into the body from left face 33 to receive and accommodate one or more optical fibers or conductors (not shown). More particularly, this hole is bounded by (from left-to-right): an internally-threaded portion 40 extending rightwardly from left end face 33, and an inwardly-facing horizontal cylindrical surface 41 continuing rightwardly therefrom to join a leftwardly-facing circular vertical bottom surface 42. Body 28 is formed integrally of glass, or some similar transparent optically-transmissive material. The tip end portion is commonly referred to as being a prism, even though it is, in fact, conical.

FIG. 3 shows the light path when the detector tip end portion is exposed to air, and is therefore above the surface of the liquid. An outgoing horizontal light beam a-b parallel to axis x—x falls upon one portion of surface 39 at an angle of incidence $\theta_i$, and is reflected downwardly along vertical path b-c against another portion of surface 39, again at an angle of incidence $\theta_i$, and is then reflected leftwardly along horizontal path c-d to a light receiver, arranged to measure the intensity of the received optical signal. The angle of incidence ($\theta_i$) is the angle between the incident beam or ray and a line normal (i.e., perpendicular) to the surface. Similarly, the angle of reflection ($\theta_r$) is the angle between the reflected ray and such normal line. By definition, the angles of incidence and reflection are equal to one another. Thus, for a conical tip of the configuration shown:

$$\theta_i = \theta_r = 45° \tag{2}$$

The "critical angle" $\theta_c$, at which the phenomenon of "total internal reflection" occurs, may be calculated according to the equation:

$$\sin \theta_c = n_2/n_1 \tag{3}$$

where $n_2$ is the index of refraction of the fluid to which the tip end portion is exposed, and $n_1$ is the index of refraction of the material of which body 28 is formed. For glass, $n_1 = 1.50$; for air, $n_2 = 1.00$. Thus, if a glass body is surrounded by air, $$\sin \theta_c = 1.00/1.50 = 0.667 \tag{4}$$

$$\theta_c = 42° \tag{5}$$

If the angle of incidence ($\theta_i$) is equal to or greater than the "critical angle" ($\theta_c$), all of the incident light falling on surface 39 will be reflected internally of the body, and none of this light will be refracted into the surrounding air. For the particular tip end portion configuration shown in FIGS. 2-4 (i.e., $\theta_i = 45° > \theta_c = 42°$), therefore, the phenomenon of "total internal reflection" occurs when the tip end portion is exposed to air. At the same time, path b-c is perpendicular to path a-b, and path c-d is perpendicular to path b-c. Hence, a conical tip end portion of this particular configuration (i.e., having an angle of convergence of 90°) is highly desired because the return path c-d is parallel to the outgoing path a-b.

FIG. 4 is a schematic view showing the light path if the tip end portion is, alternatively, surrounded by water. The geometry of the tip end portion is unchanged. Hence, $$\theta_i = \theta_r = 45° \tag{6}$$

However, the index of refraction for water is $n = 1.33$. Hence, the "critical angle" must be recalculated, as follows:

$$\sin \theta_c = n_2/n_1 = 1.33/1.50 = 0.887 \tag{7}$$

$$\theta_c = 62.5° \tag{8}$$

Thus, when the tip end portion is surrounded by water, the angle of incidence ($\theta_i = 45°$) for the particular probe configuration shown in FIGS. 2-4 is less than the "critical angle" ($\theta_c = 62.5°$). Hence, light will be refracted into the water at points b and c, and the intensity of the balance of reflected light reaching point d will therefore be reduced. The angle of refraction ($\theta_2$) may be calculated according to the equation:

$$n_1 \sin \theta_i = n_2 \sin \theta_2 \tag{9}$$

Thus, for the structure shown in FIG. 4:

$$\sin \theta_2 = (n_1/n_2)\sin \theta_i = (1.50/1.33)(.707) = 0.797 \tag{10}$$

$$\theta_2 = 53° \tag{11}$$

The device shown in FIGS. 2-4 may, therefore, be used as a liquid level detector to distinguish between whether the surrounding fluid is air or water. If the tip end portion is submerged in water, the angle of incidence ($\theta_i = 45°$) will be less than the critical angle ($\theta_c = 62.5°$). Hence, light will be refracted into the water at two places, and the intensity of light reflected back to point d will be relatively low. On the other hand, if the tip end portion is surrounded by air, then the angle of incidence ($\theta_i = 45°$) will be greater than the critical angle ($\theta_c = 42°$). Hence, "total internal reflection" will occur, and the reflected light at point d will be of relatively high intensity. Thus, the difference in the intensity of the reflected light at point d may be used to indicate whether the tip end portion is above or below the surface of the liquid. The probe shown in FIGS. 2-4 and described above, is therefore operable to determine whether the tip end portion is exposed to air or is submerged in liquid.

Modified Prior Art Detector (FIGS. 5-7)

Because of the fact that some optical-quality materials are subject to chemical attack, others have proposed that the sensor body be made of a material which is immune to the effects of such corrosive fluids. One such material is Teflon ® PFA, the material of which tanks are typically made. Thus, it has been proposed to build a detector body having a tip end portion of the shape and configuration shown in FIG. 2, albeit formed of Teflon ® PFA. Such a modified probe is shown in FIG. 5. This probe is physically identical to probe 25 in all material respects, except for the fact that it is formed of the alternative material. Hence, the same reference numerals have again been used to identify the previously-described parts, portions or surfaces.

FIG. 6 depicts the light path if such tip end portion were to be exposed to air. Since the geometry of the tip is the same as before, the path of reflected light (i.e., a-b, b-c, c-d) is the same, and the angles of incidence ($\theta_i$) and reflection ($\theta_r$), are the same as previously described. Thus, $$\theta_i = \theta_r = 45° \tag{12}$$

However, the index of refraction for Teflon ® PFA is about 1.35. Thus, when the tip end portion is exposed to air, the "critical angle" is:

$$\sin \theta_c = n_2/n_1 = 1.00/1.35 = 0.741 \tag{13}$$

$$\theta_c = 48° \tag{14}$$

Thus, in this instance, even when the tip end portion is exposed to air, the angle of incidence ($\theta_i = 45°$) is less than the "critical angle" ($\theta_c = 48°$). Hence, light will be refracted at points b and c into the air, and the intensity of the light reflected back to point d will therefore be reduced. The angle of refraction ($\theta_2$) in air may be calculated according to the equation:

$$n_1 \sin \theta_i = n_2 \sin \theta_2 \tag{15}$$

$$\sin \theta_2 = (n_1/n_2) \sin \theta_i = (1.35/1.00)(0.707) = 0.954 \tag{16}$$

$$\theta_2 = 72.5° \tag{17}$$

FIG. 7 is a schematic view showing the light path if such proposed probe tip were to be submerged in water. Since the tip geometry is unchanged, the path of reflected light (i.e., from a-b, to b-c, to c-d) is unchanged. However, when submerged in water, the "critical angle" is:

$$\sin \theta_c = n_2/n_1 = 1.33/1.35 = 0.985 \tag{18}$$

$$\theta_c = 80° \tag{19}$$

Thus, since the angle of incidence ($\theta_i = 45°$) is less than the critical angle ($\theta_c = 80°$), light will still be refracted unto the water at points c and d. The angle of refraction is calculated below:

$$n_1 \sin \theta_i = n_2 \sin \theta_2 \tag{20}$$

$$\sin \theta_2 = (n_1/n_2) \sin \theta_i = (1.35/1.33)(0.707) = 0.718 \tag{21}$$

$$\theta_2 = 46° \tag{22}$$

Therefore, the effect of changing the material of the body from glass (n=1.50) to Teflon ® PFA (n=1.35), while keeping the configuration of the prismatic tip end portion otherwise the same, is to vary the "critical angle" with respect to both air and water. As demonstrated above, the significance of this is that in both cases (i.e., whether exposed to air or submerged in water), the angle of incidence for a 45° conical tip will be less than the "critical angle" with respect to both air and water (i.e., $\theta_i = 45° < \theta_c = 48°$ for air, and $\theta_i = 45° < \theta_c = 80°$ for water). Hence, such modified device would not be able to use the principle of "total internal reflection" vis-a-vis refraction, to discern the difference between whether the probe tip is above or below the surface of the liquid.

Another problem is that Teflon ® PFA is not optically clear, in the sense that glass and sapphire are. Indeed, if extruded, Teflon ® PFA has a familiar white color. The significance of this is that, while Teflon ® PFA might well be immune from chemical attack, it is only semi-transparent. Hence, what light is reflected along path a-b-c-d will be diffused such that the intensity of reflected light reaching point d will be further reduced by such diffusion.

Faced with the above failure of others, Applicant has devised an improved tip configuration, as will now be described.

First Improved Tip (FIGS. 8-10)

Referring now to FIG. 8, Applicant has devised an improved probe tip, generally indicated at 43, which is substantially similar to that previously described except for the tip end portion. Hence, the same reference materials have again been used to refer to the same structure previously described. The salient difference is that the tip end portion has an outwardly- and rightwardly-facing frusto-conical surface 44 terminating in a rightwardly-facing circular vertical right end face 45. The body is again formed of Teflon ® PFA, but has been molded rather than having been extruded. The difference between molding and extruding is that the molded form is more transparent and less cloudy, than is the extruded form. Extruded Teflon ® PFA has a characteristic white color, somewhat resembling the color of whole milk, whereas the molded material has less-cloudy color, as if such milk had been diluted many times with water. The salient here is that the molded material is substantially less cloudy and more transparent to the naked eye, than is the extruded material. Thus, by using molded Teflon ® PFA, the diffusion of the internally-reflected light will be substantially reduced.

FIG. 9 is an enlarged schematic view of the frusto-conical tip end portion shown in FIG. 8, and depicts the path of light reflection when the tip end portion is exposed to air. Light from the source travels through the body along horizontal path a-b to fall incident on one portion of surface 44 at point b. Such light is reflected at point b downwardly and rightwardly along path b-c to fall incident on end face 45 at point c. Light is reflected from point c downwardly and leftwardly along path c-d to fall incident on another portion of surface 44 at point d, and is further reflected from point d along horizontal path d-e back toward a light receiver. Paths a-b and d-e are each substantially parallel to axis x—x. Frusto-conical surface 44 converges rightwardly at an imaginary inclined angle of 60°. Hence, when viewed through any plane including axis x—x, the three cross-sectional tip end surfaces are oriented with respect to one another by adjacent equal angles of 120°. Thus, the angle of incidence ($\theta_i$) at points b, c and d is 60°, and, by definition, the angle of reflection ($\theta_r$) at these three points is also 60°. As demonstrated in equation (14), the "critical angle" ($\theta_c$) of such material when the tip end portion is exposed to air is about 48°. Since the angle of incidence is greater than the "critical angle" (i.e., $\theta_i = 60° > \theta_c = 48°$), all of the light will be reflected internally of the body. None will be refracted into the air. Thus, the intensity of reflected light at point e will be relatively high.

Referring now to FIG. 10, if the tip end portion is submerged in water, the critical angle will be 80°, as demonstrated in equation (19) above. However, since the angle of incidence is now less than the "critical angle" (i.e., $\theta_i = 60° < \theta_c = 80°$), some of the light falling on each of points b, c and d will be refracted unto the water. The angle of refraction will be:

$$n_1 \sin \theta_i = n_2 \sin \theta_2 \tag{23}$$

$$\sin \theta_2 = (n_1/n_2) \sin \theta_i = (1.35/1.33)(0.867) = 0.880 \tag{24}$$

$$\theta_2 = 62° \tag{25}$$

Moreover, light will be refracted unto the water from three points (i.e., b, c and d), rather than just two for the conical tip shown in FIGS. 2 and 5. This will further diminish the intensity of the reflected light at point e.

Thus, the invention provides an improved optical liquid level detector which may be formed of a material (e.g., Teflon ® PFA, etc.) which is immune to attack by corrosive liquids (e.g., HF, H$_2$SO$_4$, etc.). By using a molded material as opposed to an extruded material, the problem of reflected light diffusion is reduced. At the same time, the improved tip configuration, in conjunction with the index of refraction of such material (e.g., n=1.35), still avails itself of the principle of "total internal reflection" if the tip end portion is exposed to air, but deliberate and intended refraction if the tip end portion is submerged in the liquid.

Second Improved Tip (FIGS. 11-12)

Referring now to FIG. 11, a modified form of the improved sensor body is shown as having a rightwardly- and outwardly-facing conical surface 46 converging at an angle of 120°. The right marginal end portion of an outgoing light guide 48 is bent downwardly at an angle of 30° with respect to the horizontal so that the angle of incidence ($\theta_i$) at point b is 60°. Path b-c is vertical, and the angle of incidence ($\theta_i$) at point c is also 60°. Light following path c-d is received in the up-turned end of return light guide 49. The tip end portion 50 is also formed of Teflon ® PFA, or the like. If the tip end portion is exposed to air, the "critical angle" ($\theta_c$) is about 48°, as demonstrated in equation (14). Since the angle of incidence ($\theta_i = 60°$) is greater than the "critical angle" ($\theta_c = 48°$), substantially all of the light will be reflected internally within the body.

FIG. 12 depicts the probe shown in FIG. 12, when submerged in water. Since the geometry is unchanged, $\theta_i = 60°$. However, the "critical angle" with respect to water is about 80°, as demonstrated in equation (19). Since $\theta_i = 60° < \theta_c = 80°$, light will be refracted unto the water at points c and d, and the intensity of the light at point d will therefore be reduced.

Modifications

The present invention expressly contemplates that many changes and modifications may be made. In the illustrated embodiments, the probe or sensor has been used to detect and determine whether the tip end portion is exposed to water or air. However, these particular fluids are exemplary only, and are not intended to be limitative of the scope of the appended claims. Indeed, other fluids may be used. The invention is not limited to use with only Teflon ® PFA. Moreover, the particular angles of the tip end portion surfaces may be changed or varied, as desired, such as to accommodate the respective refractive indices of the body material and the first and second fluids to which the tip end portion is exposed. While the tip end portion shown in FIG. 8 is frusto-conical, other truncated-prismatic and ungulated shapes may possibly be substituted therefor.

Therefore, while the preferred embodiment of the improved optical liquid level detector has been shown and described, and several modifications thereof discussed, persons skilled in this art will readily appreciate various additional changes and modifications may be made without departing from the spirit of the invention, as defined and differentiated by the following claims.

I claim:

1. An optical detector, comprising:
a light-transmissive body formed of polytetraflourethylene perflouroalkoxy material and terminating in a tip end portion, said tip end portion being adapted to be exposed to first and second fluids of different refractive indices:
a light source for supplying a beam of light through said body to said tip end portion:
a light receiver for measuring the intensity of light reflected back from said tip end portion through said body;
said tip end portion having first, second and third cross-sectional surfaces, said first surface being arranged to receive incident light from said source and to reflect light to said second surface, said second surface being arranged to reflect light received from said first surface to said third surface, said third surface being arranged to reflect light received from said second surface toward said light receiver, each of said surfaces being inclined at an angle of incidence with respect to light falling incident thereon equal to or greater than the critical angle when said tip end portion is exposed to said first fluid so that substantially all of the light in said beam will be reflected internally of said body, at least one of said surfaces being inclined at an angle with respect to light falling incident thereon less than the critical angle when said tip end portion is exposed to said second fluid so that a portion of such incident light will be refracted into said second fluid;
whereby the intensity of light reflected to said receiver will be less when said tip end portion is exposed to said second fluid than when said tip end portion is exposed to said first fluid.

2. An optical detector as set forth in claim 1 wherein the angle of incidence of each of said surfaces is less than the critical angle when said tip end portion is exposed to said second fluid.

3. An optical detector as set forth in claim 1 wherein said tip end portion is frusto-conical.

4. An optical detector as set forth in claim 1 wherein said first fluid is a gas and said second fluid is a liquid.

5. An optical detector as set forth in claim 1 wherein said first fluid is air having a refractive index of about 1.00, said second fluid is a liquid having a refractive index of about 1.33, and said body has a refractive index of about 1.35.

6. An optical detector as set forth in claim 5 wherein said body is formed of molded polytetraflourethylene perflouroalkoxy material.

7. An optical detector as set forth in claim 6 wherein the angle of incidence of each of said surfaces is about 60°.

8. An optical detector, comprising:
a light-transmissive body formed of polytetraflourethylene perflouroalkoxy material and terminating in a conical tip end portion, said tip end portion being adapted to be exposed to first and second fluids of different refractive indices; a light source for supplying a beam of light through said body to said tip end portion; and a light receiver for measuring the intensity of light reflected from said tip end portion through said body; said conical tip end portion having a first cross-sectional surface arranged to reflect light received through said body from said source onto a second surface, said second surface being arranged to reflect light received from said first surface toward said receiver, and wherein said body is formed of a material having a refractive index such that the angle of incidence of light issuing from said source along a path parallel to the axis of said tip end portion will be less than the critical angle with respect to each of said first and second fluids;
a first light guide provided in said body for directing a beam of light from said source to said first surface;
a second light guide provided in said body for transmitting light reflected from said second surface to said receiver;
said first and second light guides being so arranged that when said tip end portion is exposed to said first fluid, the angle of incidence of light falling on each of said first and second surfaces will be equal to or greater than the critical angle with respect to said first fluid, but when said tip end portion is exposed to said second fluid the angle of incidence of light falling on each of said first and second surfaces will be less than the critical angle with respect to said second fluid;
whereby, the intensity of light reflected to said receiver will be less when said tip end portion is exposed to said second fluid than when said tip end portion is exposed to said first fluid.

9. An optical detector, comprising:
a light-transmissive body terminating in a tip end portion, said tip end portion being adapted to be exposed to first and second fluids of different refractive indices; a light source for supplying a beam of light through said body to said tip end portion; and a light receiver for receiving light reflected back from said tip end portion through said body; said body being formed of a material having a refractive index with respect to each of said first and second fluids of about 1.35, said tip end portion having a plurality of surfaces so configured and dimensioned that incident light from said source will be reflected back toward said receiver, the angle of incidence of each surface being equal to or greater than the critical angle with respect to said first fluid but less than the critical angle with respect to said second fluid;

whereby substantially all of the light from said source will be reflected internally of said body when said tip end portion is exposed to said first fluid, but a portion of the light from said source will be reflected when said tip end portion is exposed to said second fluid.

10. An optical detector as set forth in claim 9 wherein said tip end portion has two surfaces.

11. An optical detector as set forth in claim 10 wherein said tip end portion is conical.

12. An optical detector as set forth in claim 9 wherein said tip end portion has three surfaces in cross-section.

13. An optical detector as set forth in claim 12 wherein said tip end portion is frusto-conical.

14. An optical detector as set forth in claim 10 wherein said body material is formed of moulded polytetraflourethylene perflouroalkoxy material.

15. An optical detector as set forth in claim 10 wherein said first fluid is a gas, and said fluid is a liquid.

* * * * *